United States Patent
Datskos

(10) Patent No.: US 6,901,802 B2
(45) Date of Patent: *Jun. 7, 2005

(54) ACOUSTIC SENSORS USING MICROSTRUCTURES TUNABLE WITH ENERGY OTHER THAN ACOUSTIC ENERGY

(75) Inventor: Panagiotis G. Datskos, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/676,286

(22) Filed: Sep. 30, 2003

(65) Prior Publication Data

US 2004/0060358 A1 Apr. 1, 2004

Related U.S. Application Data

(62) Division of application No. 09/397,276, filed on Sep. 16, 1999, now Pat. No. 6,651,504.

(51) Int. Cl.⁷ ................................................ G01H 1/00
(52) U.S. Cl. ............................ 73/651; 73/632; 367/103
(58) Field of Search .......................... 73/584, 579, 594, 73/596, 627–629, 651, 632, 514.36, 514.37, 514.32, 514.33; 367/103

(56) References Cited

U.S. PATENT DOCUMENTS

| | | | | |
|---|---|---|---|---|
| 4,479,389 A | * | 10/1984 | Anderson et al. | 73/651 |
| 4,885,781 A | * | 12/1989 | Seidel | 381/351 |
| 5,565,847 A | * | 10/1996 | Gambino et al. | 340/572.6 |
| 5,925,822 A | * | 7/1999 | Naughton | 73/628 |
| 6,012,334 A | * | 1/2000 | Ando et al. | 73/651 |
| 6,438,243 B1 | * | 8/2002 | Ikeuchi et al. | 381/191 |

* cited by examiner

Primary Examiner—Hezron Williams
Assistant Examiner—Rose M. Miller
(74) Attorney, Agent, or Firm—Kilpatrick Stockton LLP; Larry A. Roberts

(57) ABSTRACT

A sensor for detecting acoustic energy includes a microstructure tuned to a predetermined acoustic frequency and a device for detecting movement of the microstructure. A display device is operatively linked to the movement detecting device. When acoustic energy strikes the acoustic sensor, acoustic energy having a predetermined frequency moves the microstructure, where the movement is detected by the movement detecting device.

21 Claims, 8 Drawing Sheets

ACOUSTIC SENSORS USING MICROSTRUCTURES TUNABLE WITH ENERGY OTHER THAN ACOUSTIC ENERGY

RELATED APPLICATION

This application is a divisional of U.S. patent application Ser. No. 09/397,276 filed Sep. 16, 1999, now U.S. Pat. No. 6,651,504, the contents of which are hereby incorporated by reference.

GOVERNMENT LICENSE RIGHTS STATEMENT

This invention was made with Government support under Contract No. DE-AC05-960R22464 awarded by the U.S. Department of Energy to Lockheed Martin Energy Research Corp., and the Government has certain rights in this invention.

TECHNICAL FIELD

The present invention relates generally to a method and apparatus for detecting acoustic energy and relates more specifically to microstructures that are tunable with energy other than acoustic energy.

BACKGROUND OF THE INVENTION

Many acoustic sensors include sound-responsive elements that resonate when they are exposed to acoustic energy. Such sound-responsive elements are typically mechanical structures that include any one of the following: a stretched membrane, a clamped diaphragm, a magnetic diaphragm held in place by magnetic forces, conical diaphragms, circular pistons, and corrugated-ribbon conductors. To transform the acoustic energy detected by the aforementioned sound-responsive elements, transducers are coupled to the sound-responsive elements. Typical transducers include the following: loose-contact transducers; moving-iron transducers; electrostatic transducers; piezoelectric transducers; and moving coil transducers.

The transducers and their corresponding sound-responsive elements have inherent size limitations as well as acoustic frequency response limitations. For example, a carbon microphone employs a diaphragm that vibrates in accordance with impulses of sound and then turns the vibrations into electric energy. The vibrations are converted into electrical energy by a piezoelectric transducing method where the diaphragm compresses the carbon granules which in turn changes the electrical resistance of the carbon granules. The electrical resistance of the carbon granules is detected by a voltage measuring device and can be processed by a correlating device which can associate the measured resistance to an acoustic frequency and acoustic intensity. With the voltage measuring device and piezoelectric tranducing method, the operating range for a carbon microphone is typically between 100 and 5,000 hertz (Hz). The carbon microphone is typically used in the mouth piece or transmitter of a telephone handset.

Carbon microphones have a finite length, width, and height that are dependent upon the range of acoustic frequencies that are intended to be detected by the carbon microphone. Due to this physical size dependency on the range of acoustic frequencies intended to be detected, a carbon microphone is typically bulky. Another drawback of a carbon microphone is that it can generate noise. The noise is typically a result of carbon granules that are packed too loosely. Another disadvantage of the carbon microphone is that if an acoustic frequency of interest lies outside the operating range of the carbon microphone, the actual physical dimensions of the carbon microphone and more specifically the sound-responsive element and transducers of the carbon microphone, must be changed or resized in order to detect such a frequency, Unlike the transducers of the carbon microphone, a dynamic microphone includes a moving coil transducer to convert the movement of a pole into electrical energy. The pole is attached to a diaphragm and is moved by sound waves striking the diaphragm. A dynamic microphone typically includes many parts: a large base permanent magnet, a coil, a diaphragm held in place by a ring, a washer, and large air spaces disposed within the permanent magnet. The dynamic microphone typically has an acoustic frequency response of 30 Hz to 18 kHz. While the dynamic microphone may a large acoustic frequent response range relative to the carbon microphone, the number and size of the dynamic microphone's operating components render it impractical for use in acoustic arrays and other array like applications. Similar to the carbon microphone, the dynamic microphone is typically designed for a set or fixed acoustic frequency range and therefore, requires substantial mechanical retrofitting or resizing to alter its acoustic frequency range response.

In addition to the size and frequency response limitations of both the dynamic microphone and carbon microphone, these microphones can cause mutual interference in large array applications. For example, if several carbon or dynamic microphones having the same frequency range are placed adjacent to one another, neighboring microphones may interfere with one another due to the sound-responsive elements of each of these microphones being tuned to the same acoustic frequency. Vibrations of one sound responsive element of a microphone may generate acoustic energy or noise relative to a neighboring microphone having a similar size sound-responsive element.

Thus there is a need for an acoustic sensor which avoids the drawbacks of the size and sensitivity of conventional acoustical sensors. There is further need for an acoustic sensor having reduced number of sound-responsive elements. Another need exists for an acoustic sensor that can reduce mutual interference between acoustic sensors placed in an array.

SUMMARY OF THE INVENTION

The present invention overcomes the problems associated with conventional acoustic detectors which have inherent limitations based on their size and sensitivity. The acoustic sensor of the present invention detects acoustic energy by entirely different sound-responsive elements and transducers. Consequently the size and frequency response limitations associated with conventional acoustic sensors are substantially eliminated by the present invention. Further, the acoustic sensor of the present invention has a reduced number of moving parts for the sound responsive element and also has the capability of substantially reducing or eliminating mutual interference between neighboring sound responsive elements in acoustic sensor array applications. The acoustic sensor of the present invention has increased sensitivity over a wide range of acoustic frequencies and has dimensions that are orders of magnitude smaller than conventional acoustic sensors. Additionally, the frequency range of the acoustic sensor of the present invention can be modified without changing the actual size of the sound responsive element.

Stated more specifically, the present invention relates generally to an acoustic sensor using microstructures tunable through energy being applied to the microstructure to create stress within the microstructure. The acoustic sensor of the present invention comprises a microstructure tuned to a predetermined acoustic frequency. The sensor also includes a device for detecting movement of the microstructure caused by acoustic energy. The sensor further includes a display device operatively linked to the detecting device. When acoustic energy strikes the sensor, acoustic energy having the predetermined frequency moves the microstructure and the movement is detected by the movement or deflection detecting device.

In addition to the movement detecting device, the acoustic sensor of the present invention can include a device for associating movement of the microstructure with a predetermined acoustic energy level. With such a correlating device, the sensor can output an intensity level of the acoustic energy being detected.

To determine the acoustic intensity energy level and presence of an acoustic frequency, the acoustic sensor detects acoustic energy with a microstructure that has a predetermined acoustic resonant length. The microstructure of the present invention can be any one of the various structures that make-up microelectromechanical systems (MEMS). Specifically, the microstructure of the present invention can be a microbar/microcantilever, a microbridge, or a microplate.

While the aforementioned microstructures of the present invention can be tuned to a predetermined acoustic resonant length, the present invention can also include a device for tuning a microstructure above or below the predetermined acoustic resonant length of a respective microstructure. This tuning device produces energy other than acoustic energy that is focused on the microstructure such that the natural acoustic resonant frequency that is dependent on the length of microstructure is altered. The energy that alters the natural acoustic resonant frequency of the microstructure can be either light energy, thermal energy, energy derived from an electric field, or mechanical energy.

Similar to the various energy forms available to the tuning device, the movement detecting device of the present invention can measure movement of the microstructure through a variety of measuring techniques. In one embodiment, the detecting device can include a laser device and light detector. In another embodiment, the movement detecting device of the present invention can include a capacitive sensing device. And further, the movement detecting device can include a voltage measuring device when the microstructure is made from piezoresistive materials. Alternatively, the detecting device can include a mechanism that monitors a change of resonance of the microstructure itself.

In another aspect of the present invention, the acoustic sensor includes a microstructure array tuned for a predetermined acoustic frequency range. The detecting device of this aspect of the present invention detects movements of individual microstructures in the microstructure array. The acoustic sensor further includes a correlating device that associates movement of individual microstructures with corresponding acoustic resonant frequencies. The acoustic sensor also includes a display device operatively linked to the movement detecting device.

According to this aspect of the invention, the detecting device monitors a selected microstructure at one time in the microstructure array. In order to monitor a selected microstructure, the acoustic sensor can further include a detuning device that detunes or tunes neighboring microstructures away from a natural acoustic resonant frequency of a selected microstructure in the microstructure array. The detuning device exposes the neighboring microstructures with energy other than acoustic energy. This energy can either be light energy, thermal energy, energy derived from an electric field, or mechanical energy.

The microstructure array can also be a two dimensional microstructure array or a three dimensional microstructure array. With a three dimensional microstructure array, the correlating device of the acoustic sensor can determine a direction of a source of the acoustic energy.

In another aspect for the present invention, the acoustic sensor can identify a target based upon a target's acoustic signature. More specifically, the target sensor includes a microstructure array tuned for a predetermined acoustic frequency range and a detecting device which detects movement of individual microstructures in the microstructure array. The sensor of this aspect of the present invention includes a correlating device that associates movement of the individual microstructures with corresponding acoustic frequencies. The correlating device further associates the detected acoustic frequencies with stored acoustic frequencies of targets in a data base. The sensor further includes a display device that displays detected acoustic frequencies and target identification received from the correlating device.

In yet another aspect of the present invention, a method for detecting acoustic energy includes tuning a microstructure to a predetermined acoustic frequency and exposing the microstructure to acoustic energy. The acoustic sensor then detects movement of the microstructure and then activates a display device to indicate that a predetermined acoustic frequency has been detected.

According to another aspect of the present invention, a method for detecting acoustic energy includes the steps of tuning a microstructure array for a predetermined acoustic frequency range and exposing the microstructure array to acoustic energy. The acoustic sensor detects movement of individual microstructures in the microstructure array and associates the movement of the individual microstructures with corresponding acoustic resonant frequencies. After some calculations or signal processing or both, the sensor displays detected acoustic frequencies on a display device.

In an additional aspect of the present invention, a method for identifying a target employs a microstructure array tuned for a predetermined acoustic frequency range. The microstructure array is then exposed to acoustic energy generated by a target. The target sensor of the method for identifying a target then detects movement of individual microstructures in the microstructure array and associates the movement of the individual microstructures with corresponding acoustic resonant frequencies. The target sensor then associates detected acoustic frequencies with stored acoustic frequencies which targets in a database. The target sensor then displays detected acoustic frequencies in identification of the target on a display device.

Thus it is an object of the present invention to provide an improved acoustic sensor.

It is another object of the present invention to tune an acoustic sensor having a microstructure by stressing the microstructure with energy other than acoustic energy without altering or changing the physical dimensions of the microstructure. A further object of the present invention is to provide an array of microstructures that detect acoustic energy where performance of a selected microstructure is not affected by neighboring microstructures.

Other objects, features, and advantages of the present invention will become apparent upon reading the following specification, when taken in conjunction with the drawings and dependent claims.

DETAILED DESCRIPTION OF THE DISCLOSED EMBODIMENT

Figure 1A:
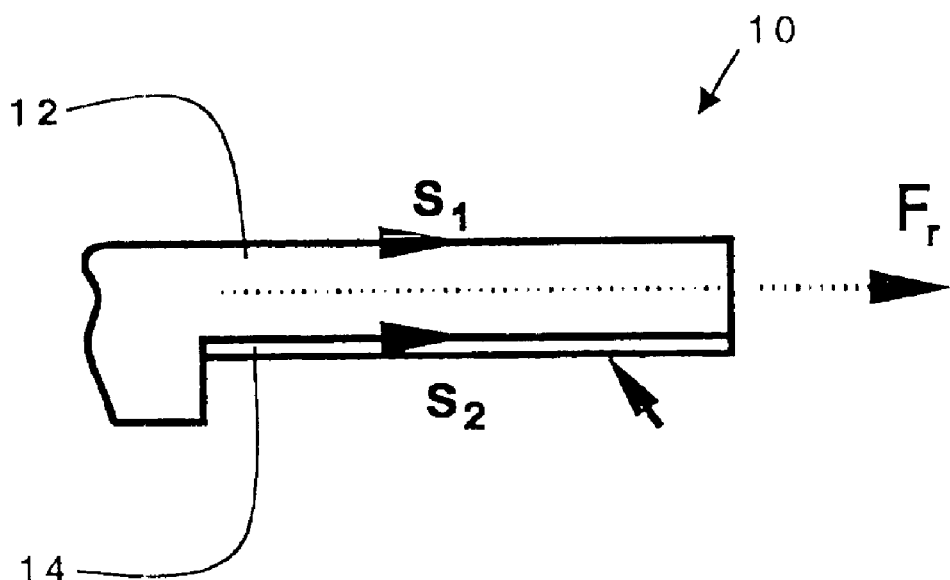
FIG. 1A is a schematic representation of a microstructure according to one embodiment of the present invention, where the microstructure is in its normal or "rest" state.

Referring now to the drawings in which like numerals indicate like elements throughout the several views, FIG. 1A shows a microstructure 10 according to one embodiment of the present invention. The microstructure 10 in this embodiment is a microbar or microcantilever. The microstructure 10 of FIG. 1A is a bimetallic microcantilever that includes a first portion 12 made from silicon (Si) or silicon nitride ($Si_3N_4$). The materials for the second portion 14 will be discussed in further detail below. Materials for microcantilevers include galium arsenide (GaAs). Microcantilevers are typically 100–200 micrometers ($\mu$m) long, 0.3–3 micrometers thick, and 10–30 micrometers wide, and can be fabricated from various dielectric or semiconducting materials. Microcantilevers made out of galium arsenide can be fabricated with a thickness of 100 nanometers (nm) or less. Microcantilevers are typically manufactured such that they are attached to a large rectangular chip (approximately 1 millimeter wide by 3 millimeters long by 1 millimeter thick). The rectangular chip can be used to facilitate manipulation and mounting of the microcantilevers. The present invention is not limited to the geometry of the microstructure illustrated in FIG. 1. Microcantilevers can have several geometries that are not illustrated in FIG. 1. For example, other geometries include, but are not limited to, triangular cantilevers, and other like geometries.

The present invention is also not limited to the microstructure 10 illustrated in FIG. 1. The microstructure 10 can be microstructures other than cantilevers. For example, other microstructures include, but are not limited to, microbars, microbridges, and microplates. The difference between microbars and microcantilevers lies in their respective width dimensions. The width dimension of a microbar is typically greater than that of a microcantilever. However, microcantilevers are sometimes referred to as falling into a class of microbars. A microbridge is a microstructure similar to a microcantilever where both ends of the microstructure are fixed. A microplate is microstructure that has both length and width dimensions and edge regions rigidly secured to prevent deflection thereof.

The microstructure 10 of FIG. 1A is sized according to an acoustic frequency of interest. The natural acoustic resonant frequency of a microstructure (in absence of applying tuning energy that can stress the microstructure as will be explained below) corresponds to the length of the microstructure. An acoustic resonant length of a microstructure can be calculated from the following equation:

$$f=(1/2\pi)(t/L^2)\sqrt{(E/\rho)}$$

where f is the frequency of interest, L is the length of the microstructure, t is the thickness of the microstructure, E is Young's modulus of the structure, and $\rho$ is the mass density of the microstructure.

The microstructure 10 further includes a second portion 14 made of the material that absorbs energy other than acoustic energy. F or example, the second portion 14 is preferably made from an infrared absorbing material such as gold black. However, other energy absorbing materials are not beyond the scope of the present invention. Other energy absorbing materials include, but are not limited to, aluminum (Al) coatings, as well as gold/chromium films or other semi-conductor materials.

Figure 1B:
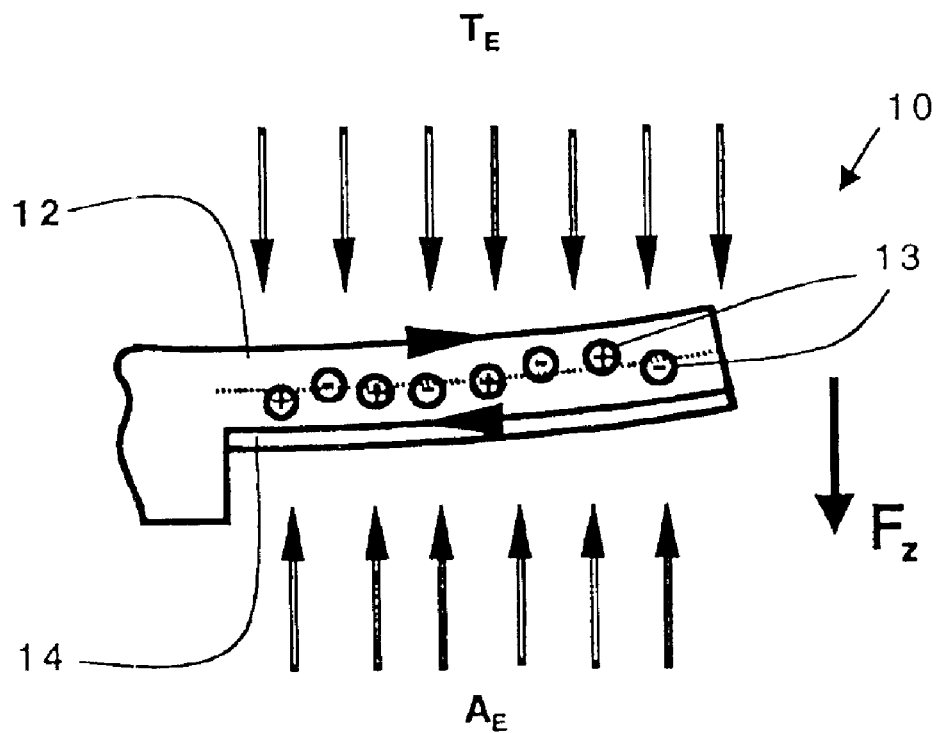
FIG. 1B is a schematic representation of a microstructure of one embodiment of the present invention, where the microstructure is a microcantilever in a deflected state caused by exposure to acoustic energy.

In the absence of tuning energy being applied to second portion 14, surface stress forces $S_1$ and $S_2$ are balanced and are at equilibrium as illustrated in FIG. 1A. Surface stress forces S1 and S2 generate a radial force Fr along a medial plane of the microstructure 10. As illustrated in FIG. 1B, the stress forces $S_1$ and $S_2$ become unequal when the microstructure is exposed to acoustic energy $A_E$ having a frequency substantially close to or equal to the acoustic resonant frequency of the microstructure 10.

The natural acoustic resonant frequency of microstructure 10 can be modified or changed by applying energy other than acoustic energy to the either the first portion 12 or second portion 14 of the microstructure 10. The energy other than acoustic energy can be any one of the following energy forms: electromagnetic energy that includes light energy such as infrared radiation or light in the visible spectrum; thermal energy such as infrared radiation at a predetermined wavelength; mechanical energy; energy derived from an electric field or magnetic field; and other like energy forms. The applied energy interacts with the microstructure 10 in such a way as to create stress, which can tune microstructure 10 to frequencies other than its natural acoustic frequency. Stress in the microstructure 10 can be created by making either the first portion 12 or second portion 14 or both portions from a material that is sensitive to or reacts with the applied energy. In a preferred embodiment, such materials of the microstructure 10 are designed to absorb the applied energy.

In one embodiment, the first portion 12 is made from a semiconductor material such as silicon. When tuning energy $T_E$ in the form of photon radiation at a predetermined frequency, intended to excite semiconductor material, is applied to the first portion 12 of microstructure 10, free charge carriers 13 (such as electrons and holes as illustrated in FIG. 1B) are created in the semiconductor material of the first portion 12. The photon radiation can be infrared, visible, ultraviolet, X-ray, gamma rays, x-rays, and microwave type photons. In a preferred embodiment, visible photons are used. The generation of free charge carriers results in the development of local mechanical stress. This photo-induced stress will cause an expansion or contraction of the lattice of the semiconductor material in the first portion 12 similar to thermal expansion or contraction. However, charge carriers can be generated in a very short time to produce photo-induced stress much faster than the creation of thermal-induced stress.

In another embodiment, the second portion 14 is made from an infrared absorbing material or coating, such as gold black. When tuning energy $T_E$ in the form of infrared radiation at a predetermined frequency, intended to thermally excite infrared absorbing material, is applied to the second portion 14 of microstructure 10, the temperature of the second portion 14 increases due to absorption of this optical tuning energy $T_E$. The infrared radiation at the predetermined frequency intended to thermally excite infrared absorbing material typically does not excite or produce charge carriers in the semi-conductor material. Thus, photo-induced stress is not created in the first semi-conductor portion 12. Generally, infrared radiation intended to thermally excite infrared absorbing material has a larger wavelength (lower frequency) than infrared radiation intended to excite semiconductor materials. When infrared radiation intended to thermally excite infrared absorbing material is applied to the second portion, and since the first portion 12 and second portion 14 are constructed from materials having dissimilar thermal expansion properties, a "bimaterial" effect will cause the microstructure 10 to deflect in response to this temperature variation.

Therefore, while it is possible to detect acoustic energy $A_E$ with the microstructure 10 due to the displacement or deflection of microstructure 10 as a result of the microstructure's natural acoustic resonant frequency, it is also possible to tune the microstructure 10 away from its natural acoustic resonant frequency by applying energy other than acoustic energy (such as optical energy in the form of photons from an infrared radiating device) so that the microstructure 10 can detect other acoustic frequencies.

In order to isolate the microstructure 10 and its tuning/detuning devices from the surrounding environment, the microstructure 10 can be coupled to an acoustic energy collector or sound-responsive element such a diaphragm. In this way, the microstructure 10 and its corresponding tuning/detuning devices can be operate in a self-contained environment so that they are protected from external environmental elements, such as water, dust, dirt, etc.

In FIG. 1B, tuning energy $T_E$ in the form of infrared radiation produces a bending force ($F_Z$) that opposes the bending force generated by acoustic energy $A_E$. In this way, it is possible to tune the microstructure 10 without actually resizing or adjusting the physical dimensions of microstructure 10. In FIG. 1, infrared radiation at a predetermined frequency intended to excite semiconductor materials is applied to the first portion 12 in order to create photo-induced stress.

The present invention is not limited to the tuning or detuning energy ($T_E$) illustrated in FIG. 1 where this tuning energy $T_E$ is in the form of light energy, and more specifically infrared radiation at a predetermined frequency intended to excite semiconductor material. Other tuning or detuning energy ($T_E$) includes, but is not limited to, thermal energy (such as infrared radiation having large wavelengths relative to radiation intended to excite semiconductor material), energy derived from an electric field, and mechanical energy. The only requirement of the detuning or tuning energy ($T_E$) is that it interacts with the microstructure 10 in such a way as to alter the natural acoustic resonant frequency of the microstructure 10 without actually changing or adjusting any of its physical dimensions.

Figure 2:
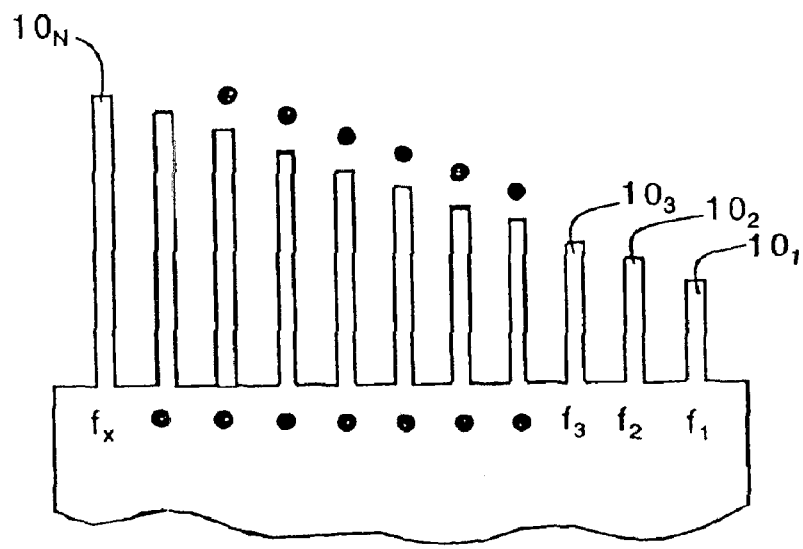
FIG. 2 is a schematic representation of a microstructure array according to another embodiment of the present invention.

Tuning energy improves sensitivity of microstructures in array applications. A plurality of microstructures 10 can be disposed in a microstructure array 20 as illustrated in FIG. 2 to detect a range or band of acoustic frequencies. Each microstructure 10 of the microstructure array 20 has a predetermined acoustic resonant length that resonates at a predetermined acoustic frequency (f). In the microstructure array 20, each microstructure 10 has a different acoustic resonant length with respect to a neighboring microstructure 10. Therefore, each microstructure 10 in the microstructure array 20 resonates at a different acoustic frequency relative to a neighboring microstructure 10. However, the present invention is not limited to this geometry of microstructure array 20. Other geometries of microstructure array 20 include, but are not limited to, multiple microstructures grouped together having the same resonant length, placing microstructures having different acoustic resonant frequencies in a random order, and other like arrangements. Also, the microstructure array 20 is not limited to the microcantilevers shown in FIG. 2. As noted above, other microstructures 10 include, but are not limited to, microbars, microplates, and microbridges.

With the arrangement of the microstructures 10 in the microstructure array 20 shown in FIG. 2, neighboring microstructures 10 may interfere or degrade the sensitivity of a microstructure $10_2$ having a frequency of interest $f_2$. For example, if a third microstructure $10_3$ having a acoustic resonant frequency $f_3$ is substantially close to the acoustic resonant frequency $f_2$ of a second microstructure $10_2$, and if a first microstructure $10_1$ having an acoustic resonant frequency $f_1$ is substantially close to the acoustic resonant frequency $f_2$ of the second microstructure $10_2$, then both the first and third microstructures $10_1$ and $10_3$ may interfere with the operation and thus affect the sensitivity of the second microstructure $10_2$. The first and third microstructures $10_1$ and $10_3$ may resonate at frequencies so close to the acoustic resonant frequency $f_2$ that they may cause the second microstructure $10_2$ to vibrate or resonate in response to vibrations caused by their movement. The present invention is designed to substantially reduce or eliminate such mutual interference between microstructures 10 in acoustic sensor array applications.

Figure 3:
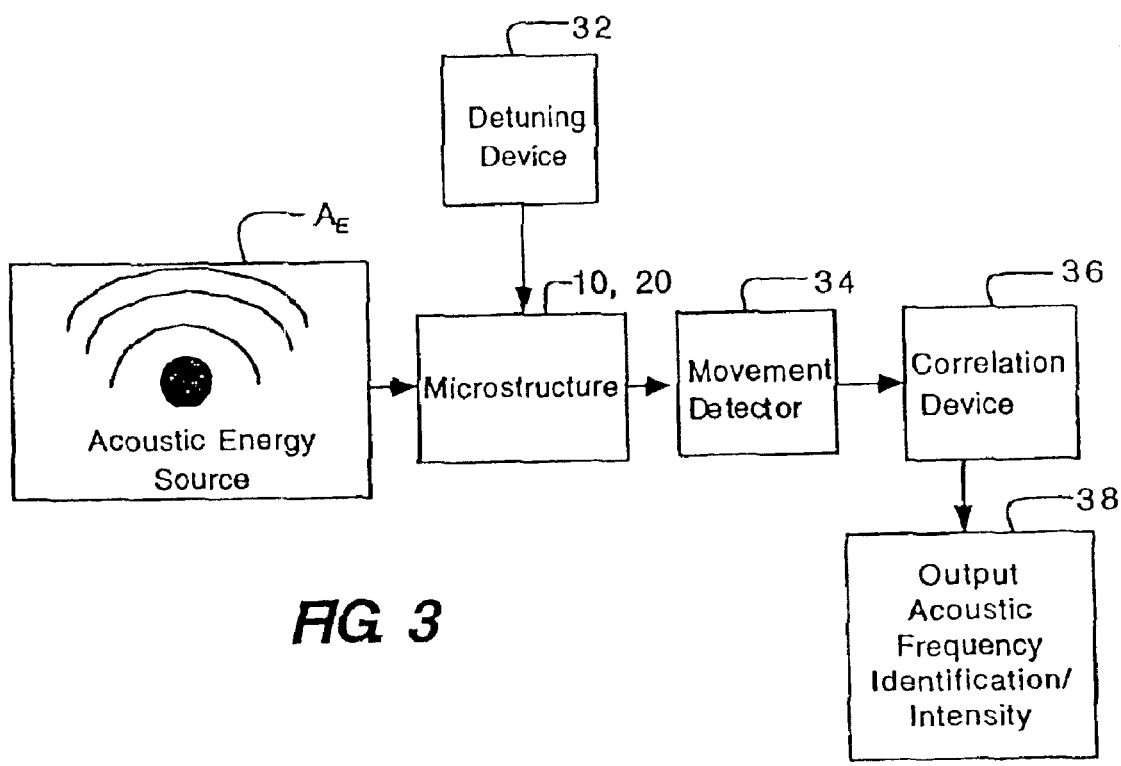
FIG. 3 is a functional block diagram of one embodiment of the acoustic sensor of the present invention.

In order to substantially reduce or eliminate mutual interference between neighboring microstructures 10 in a microstructure array 20, the acoustic sensor 30 of the present invention has a detuning device 32 as illustrated in FIG. 3. In a single microstructure 10 embodiment, the detuning device 33 can be used to tune the single microstructure 10 to other acoustic frequencies other than the natural acoustic frequency of the microstructure 10 that is dependent upon the physical length of the microstructure 10.

The acoustic sensor 30 further includes a movement or deflection detector 34 that monitors or measures the amount of deflection of a particular microstructure 10 of interest. The movement detector 34 communicates deflection and data to a correlation device 36. The correlation device 36 associates the movement of an individual microstructure 10 in an array 20 with a corresponding acoustic resonant frequency of the microstructure 10 and a predetermined acoustic energy level. After associating the movement of an individual microstructure 10 with its corresponding acoustic frequency and intensity level, the correlation device 36 outputs an acoustic frequency identification and/or intensity level 38.

The detuning device 32 can produce any one of the tuning or detuning energies $T_E$ discussed above with respect to FIG. 1 above. For example, the detuning device 32 may produce light energy, thermal energy, energy derived from an electric field, or mechanical energy as long as such energy can alter the natural acoustic resonant frequency of the microstructure 10 without resizing or changing the physical dimensions of the microstructure 10. Further, the detuning device 32 may apply tuning energy $T_E$ to a microstructure $10_2$ having a frequency of interest $f_2$ in order to tune such a microstructure to a predetermined acoustic frequency while applying energy at different magnitudes to neighboring microstructures 10 and 103 such that the neighboring microstructures $10_1$ and $10_3$ are detuned or substantially tuned away from the microstructure $10_2$ having the acoustic resonant frequency of interest $f_2$.

In a microstructure array 20 of a preferred embodiment, each of the microstructures in the microstructure array 20 may have acoustic resonant lengths from 100 micrometers ($\mu$m) to a few millimeters (mm) such that acoustic energy having a frequency of 100 Hz to 10 Kilohertz (kHz) can be detected. However, with detuning device 32, the exemplary frequency range can be expanded or contracted according to the amount of tuning or detuning energy $T_E$ applied to the microstructures 10 of the microstructure array 20 having the frequency of interest.

Figure 4:
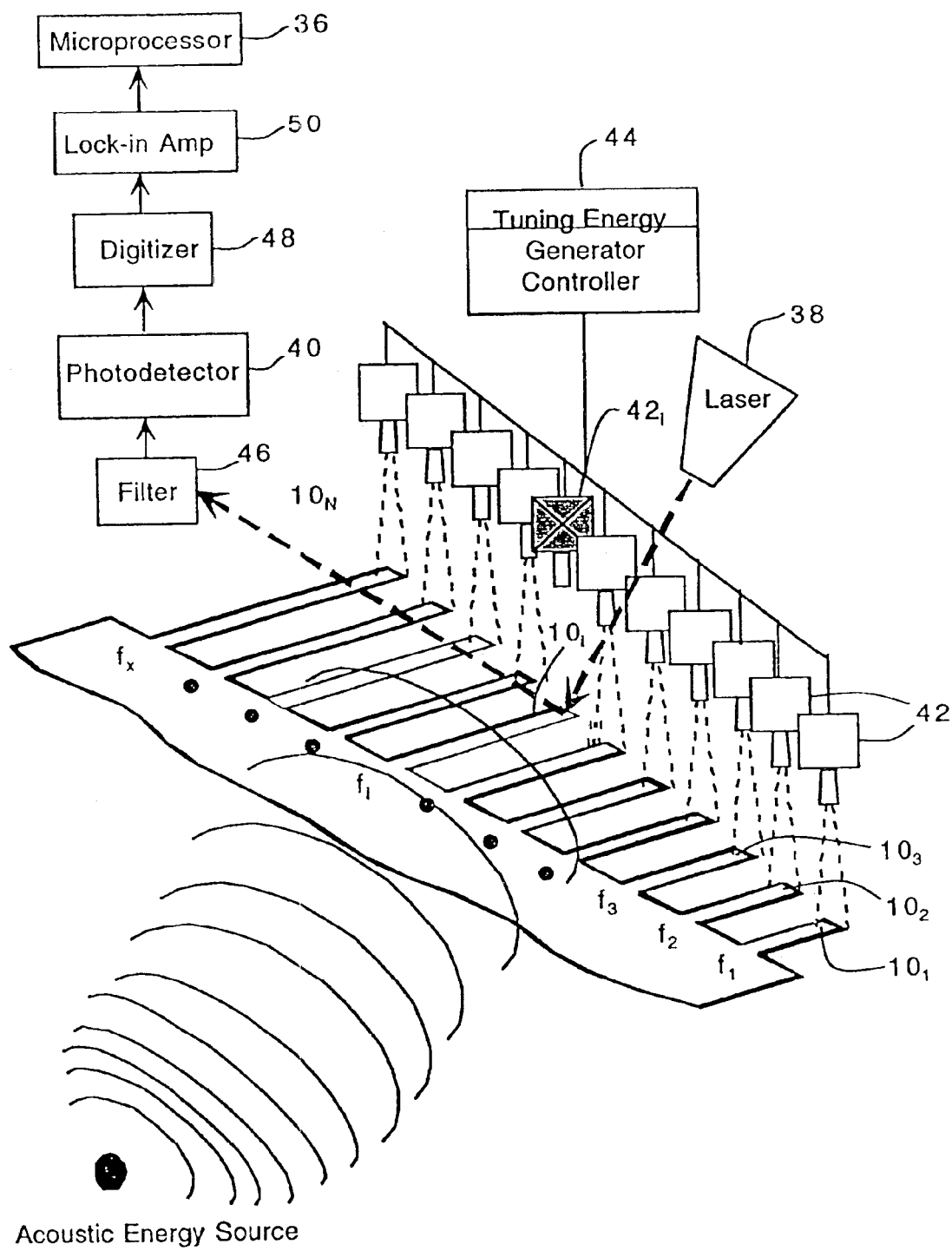
FIG. 4 is a schematic representation of a method and apparatus for detecting the extent of movement or deflection of one microstructure in a microstructure array of the present invention.

Similar to the detuning device 32, the movement or deflection detector 34 can be any one of a number of movement detection devices. For example, the movement detector 34 can include a laser 38 operatively linked to a photodetector 40 as illustrated in FIG. 4. However, other deflection detection devices 34 are not beyond the scope of the present invention. Other deflection detection devices 34 include voltage measuring devices that are coupled to a microstructure 10 made of piezoresistive materials. Other deflection detection devices 34 include devices that sense a change in capacitance due to displacement of the microstructure 10 or devices that measure or monitor a change of resonance of the microstructure 10. For example, changes in resonance of a microstructure can be detected by measuring the change in the degree of bending of a microstructure as a function of frequency. When the deflection of a microstructure peaks at a certain frequency, resonance of the microstructure has been detected.

In FIG. 4, a microstructure array 20 includes a plurality of microstructures $10_N$. Each of these microstructures $10_N$ resonates at a discrete acoustic resonant frequency $f_x$. The resonant frequency $f_x$ of neighboring microstructures $10_N$ relative to a microstructure $10_i$ having a frequency of interest $f_i$ are detuned by tuning energy $T_E$. Tuning energy generators 42 produce the tuning energy $T_E$.

The tuning energy generators 42 are controlled by a tuning energy generator controller 44. This controller tunes away the neighboring microstructures $10_N$ relative to the microstructure $10_i$ having the frequency of interest $f_i$. By detuning the neighboring microstructures $10_N$, the microstructure $10_i$ having the resonant frequency of interest $f_i$ can readily detect acoustic energy from an acoustic energy source if the acoustic energy source produces acoustic energy having the predetermined frequency of interest $f_i$. The detuning of neighboring microstructures $10_N$ substantially increases the sensitivity of the microstructure $10_i$ having the frequency of interest $f_i$ since noise or mutual interference of neighboring microstructures is substantially reduced or eliminated. Therefore, the movement detector 34 only detects deflections of microstructure $10_i$ having the frequency of interest $f_i$ that are directly attributed to the acoustic energy source.

In the exemplary embodiment illustrated in FIG. 4, the movement detector 34 includes a bandpass filter 46 to block scattered light from the laser 38. The photodetector 40 can include a dual element photodiode displacement detector to collect the reflected light energy from the microstructure 10; having the having the frequency of interest $f_i$. The dual element photodiode photodiode displacement detector 40 produces a difference signal that is digitized by a digitizer 48. The digitizer 48 then forwards this signal to a lock-in amplifier 50 where the difference signal is extracted and averaged.

The lock-in amplifier 50 then can feed the averaged signal to a microprocessor or correlation device 36. While the correlation device 36 is preferably a microprocessor in this embodiment, other correlation devices are not beyond the scope of the present invention. Such correlation devices 36 can be either hardwired or be made of application specific integrated chips (ASIC), and other like devices. The correlation device 36 associates the movement of the microstructure $10_i$ having the frequency of interest $f_i$ with the corresponding acoustic resonant frequency intended to be detected. The correlation device 36 can also calculate the intensity of the detected acoustic energy based upon the amount of deflection of the microstructure $10_i$ having the frequency of interest $f_i$.

By employing rapid scanning of the microstructures 10 of the microstructure array 20, the correlation device 36 of the acoustic sensor 30 of FIG. 4 can match and measure a plurality of acoustic frequencies generated by the acoustic energy source $A_E$. The tuning energy controller 44 can activate and deactivate tuning energy generators 42 very quickly (such as in time increments of milliseconds—ms or microseconds—$\mu$s). Further, the laser 38 can include multiple focusing devices (not shown in the drawings) such that the laser 38 can irradiate the microstructure $10_i$ having the frequency of interest. The rapid scanning of the microstructure array 20 permits the acoustic sensor 30 to perform a spectral analysis of the acoustic energy being detected where movement or deflection of each microstructure 10 of the microstructure array 20 related to a frequency of interest is evaluated. The acoustic sensor 30 has substantially increased sensitivity relative to conventional acoustic sensors by having a substantially reduced packaging size where the largest microstructure 10 is only a few millimeters in length. Further, the acoustic sensor 30 of FIG. 4 has a substantially reduced number of moving parts that are seldom prone to mechanical degradation over the life of the acoustic sensor 30.

Figure 5:
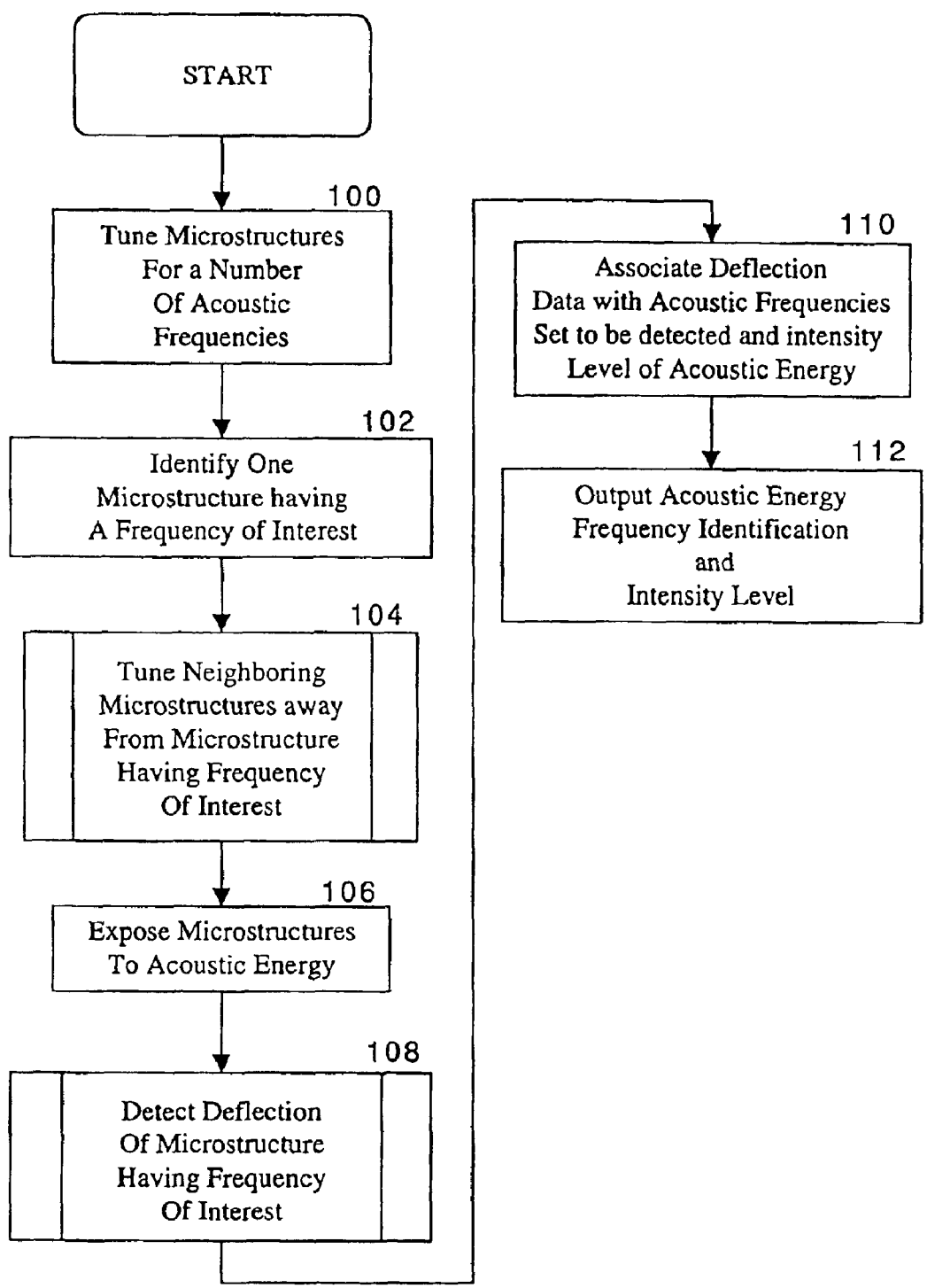
FIG. 5 is a logic flow diagram illustrating a process for detecting acoustic energy with a microstructure array.

Description of Operation of the Preferred Apparatus With Reference to the Logic Flow Diagrams FIG. 5 is a logic flow diagram of the process of detuning neighboring microstructures in a microstructure array 20. Step 100 in FIG. 5 is the first step of the process of the detuning neighboring microstructures in microstructure array 20. In step 100, each of the microstructures 10 is tuned to a predetermine acoustic frequency. In step 102 the detuning device 32 identifies a microstructure $10_i$ having a frequency of interest $f_i$. In routine 104, the detuning device 32 tunes or detunes neighboring microstructures $10_N$ away from the microstructure $10_i$ having the acoustic frequency of interest $f_i$. Further details of routine 104 are described with respect to FIG. 6 below. The method then proceeds to step 106 where the microstructures 10 of the microstructure array 20 are exposed to acoustic energy.

In routine 108, the deflection detector detects the movement or deflection of the microstructure $10_i$ having the acoustic frequency of interest $f_i$. Further details of routine 108 will be described with respect to FIG. 7 below.

Following routine 108, in step 110, the correlation device 36 associates the deflection data received from the deflection detector 34 with acoustic frequencies that are set to be detected. The correlation device 36 can associate an intensity level of acoustic energy with the measured deflection. In step 112, the acoustic sensor 30 identifies the detected acoustic frequency and intensity level of the acoustic frequency.

Figure 6:
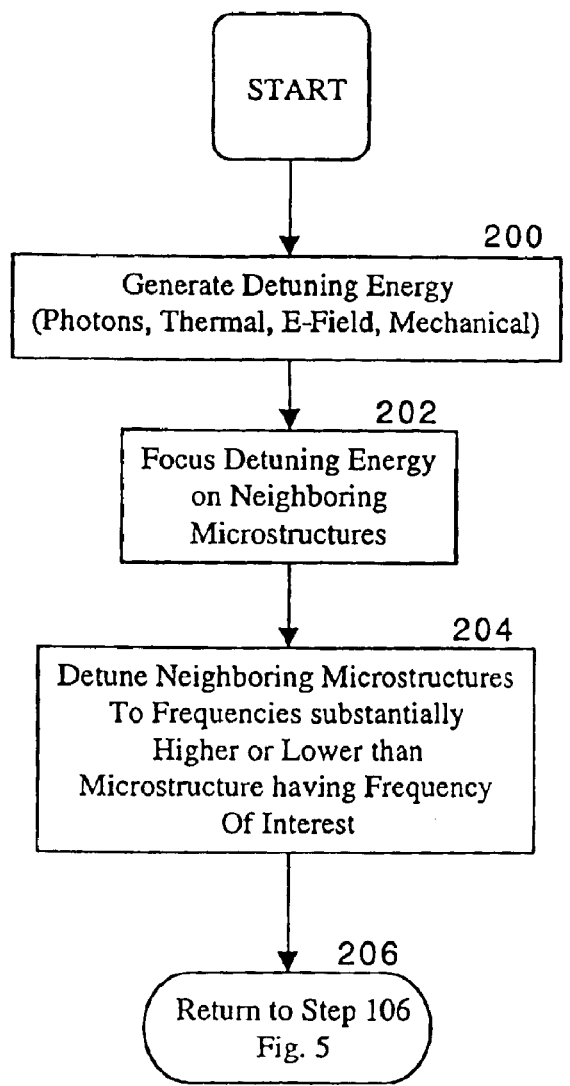
FIG. 6 is a logic flow diagram illustrating a process for detuning neighboring microstructures away from a microstructure having a frequency of interest.

In FIG. 6, routine 104 is illustrated where neighboring microstructures in a microstructure array 20 are tuned away from a microstructure 10; having a frequency of interest $f_i$. Step 200 is the first step of routine 104. In step 200, the detuning device 32 activates tuning energy generators 42 to produce tuning or detuning energy $T_E$. This detuning energy can be in the form of optical energy (such as photons), thermal energy, energy in the form of an electric field, and mechanical energy. In step 202, the tuning energy controller 44 focuses detuning energy $T_E$ on neighboring microstructures $10_N$ of the microstructure array 20. In step 204, the tuning energy control 44 detunes the neighboring microstructures to acoustic frequencies substantially higher or lower than the microstructure 101 having the acoustic frequency of interest $f_i$ in order to substantially reduce or eliminate any interfering mechanical oscillations from the neighboring microstructures. In step 206, the process returns to step 106 illustrated in FIG. 5.

Figure 7:
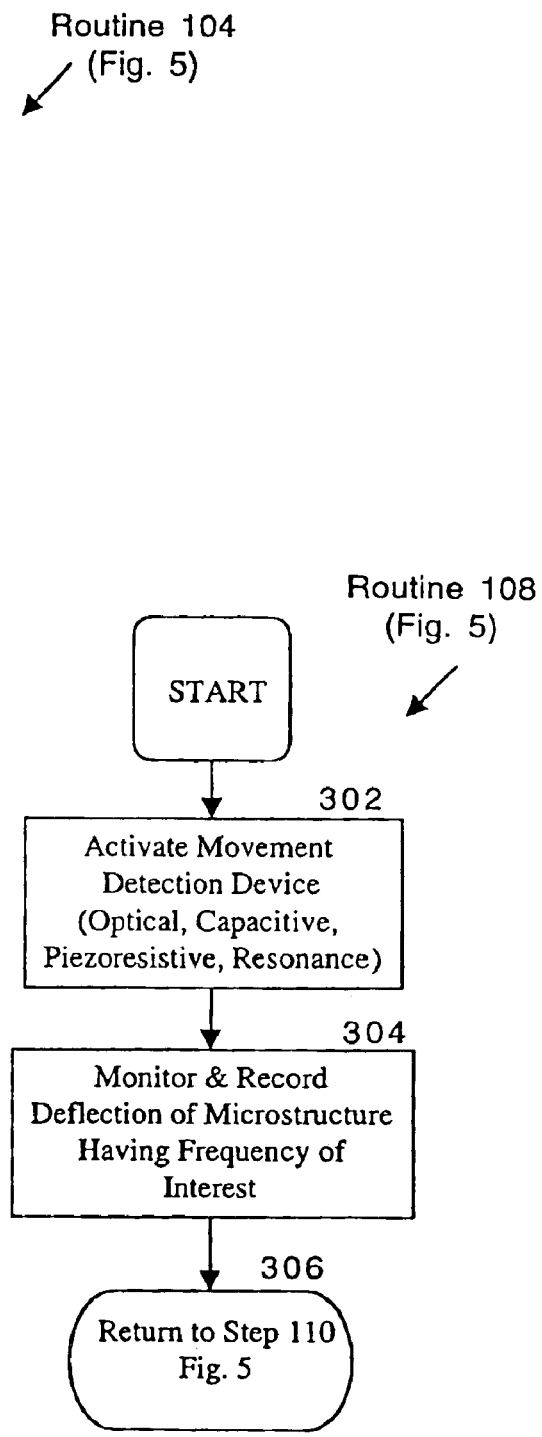
FIG. 7 is a logic flow diagram illustrating a process for detecting deflection of a microstructure having a frequency of interest.

In FIG. 7, routine 108 where deflection of the microstructure $10_i$ having the frequency of interest $f_i$, is illustrated. Step 302 is the first step in routine 108. In step 302, the acoustic sensor 30 activates the movement or deflection detection device 34. As noted above, the movement detection device 34 can employ optical, capacitive, piezoresistive, or resonance measuring techniques to measure the deflection of the microstructure 107 having the frequency of interest $f_i$. In step 304, the movement detection device 34 monitors and records the deflection of the microstructure $10_i$ having the acoustic frequency of interest $f_i$. In step 306, the process returns to step 110 as illustrated in FIG. 5.

Three Dimensional Microstructure Array

Figure 8:
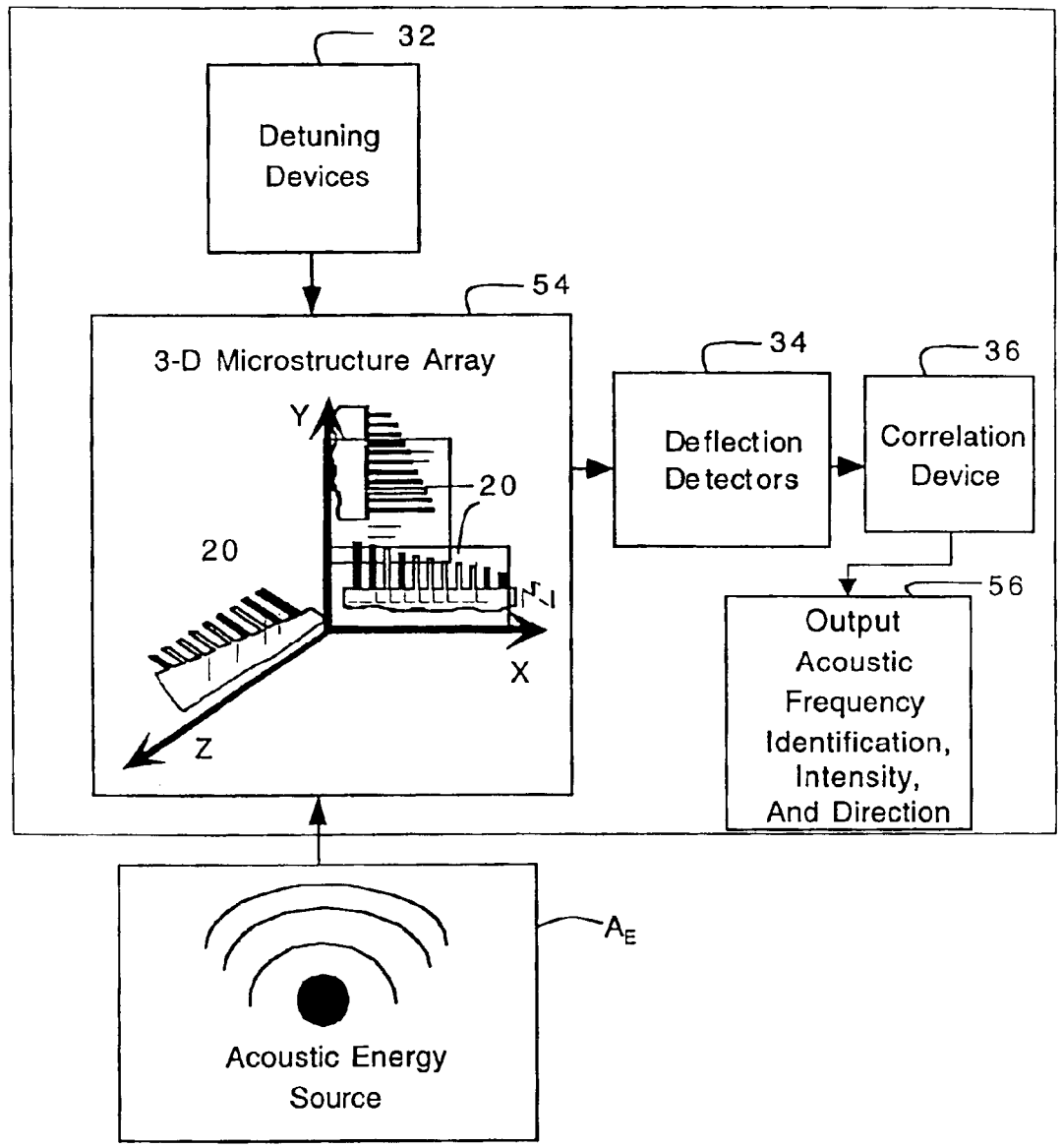
FIG. 8 is a schematic representation of one embodiment of an acoustic sensor of the present invention.

In FIG. 8, another embodiment of the acoustic sensor 30 is illustrated.

In this embodiment, the acoustic sensor 30 includes a three dimensional microstructure array 54 that includes microstructure arrays 20 arranged in an orthogonal manner with respect to each other. However, other geometrical configurations are not beyond the scope of the present invention where the microstructure arrays 20 are aligned at angles other than 90 degrees. The 3-D microstructure array 54 may include any geometrical configuration where it is possible to triangulate or detect the direction of an acoustic energy source $A_E$. In one embodiment as illustrated in FIG. 8, the microstructure arrays 20 are oriented such that the larger microstructures of each individual array 20 are positioned adjacent to the origin of orthogonal axes that make up the 3-D microstructure array 54. With such an orientation, interfering vibrations from the larger/longer microstructures relative to the smaller/shorter microstructures is substantially reduced, which in turn improves the sensitivity and overall performance of the 3-D microstructure array 54.

In this embodiment, the acoustic sensor 30 includes detuning devices 34 and movement detectors 32 that correspond to respective microstructure arrays 20 of the three dimensional microstructure array 54. With this embodiment, the correlation device 36 can identify acoustic frequencies being detected, their respective intensity levels, and additionally, the direction or bearing of the acoustic energy source $A_E$. The correlation device 36 is able to identify direction of an acoustic energy source $A_E$ by utilizing data from each of the arrays in the three dimensional microstructure array arrangement 54. As noted above, the present invention is not limited to a three dimensional embodiment and can include any number of microstructure arrays 20 so long that direction or bearing data of acoustic energy is possible.

Target Identification and Identification of Target Direction

Figure 9:
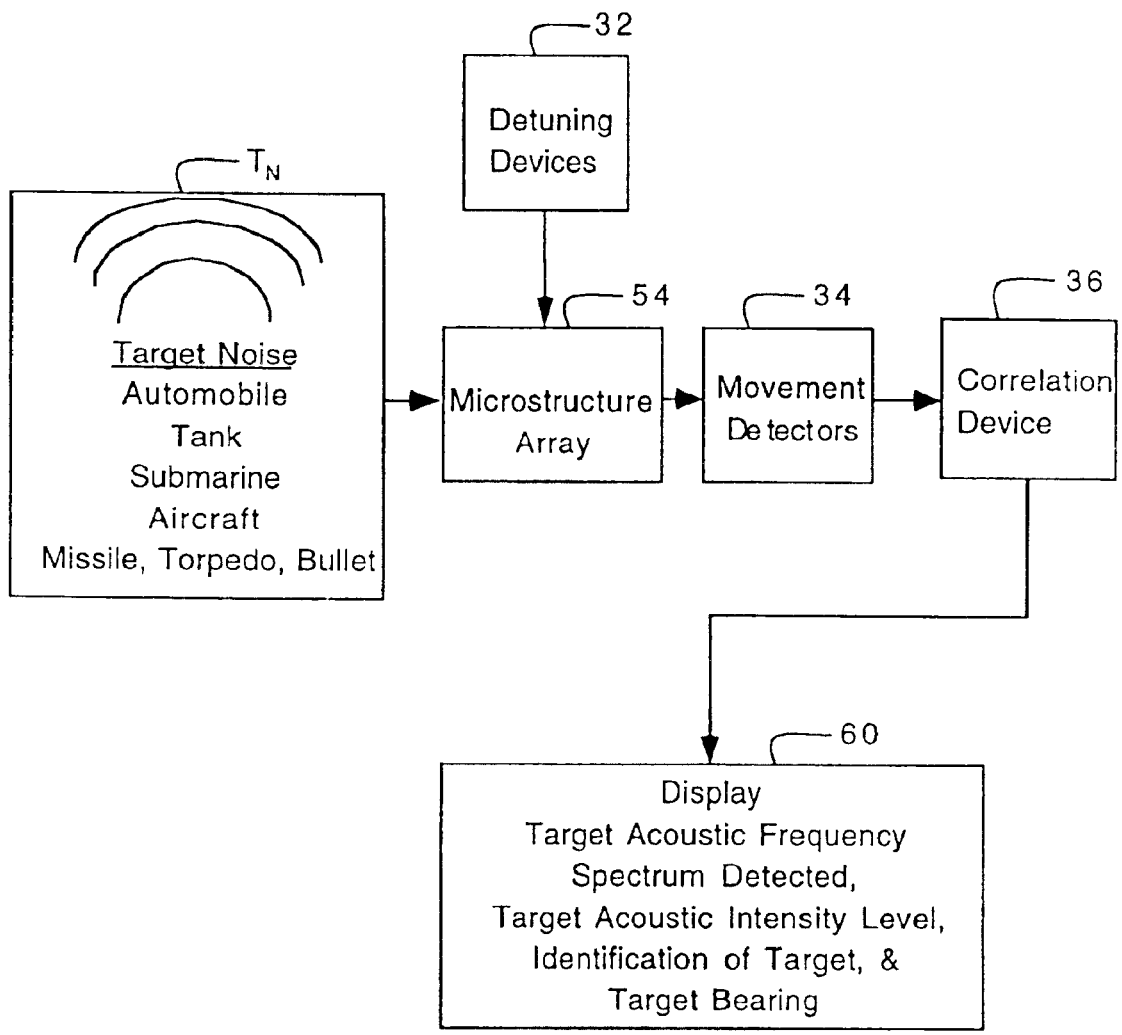
FIG. 9 is a schematic representation of a target sensor that identifies a target based upon the acoustic frequency detected from the target.

FIG. 9 illustrates another embodiment of the present invention where a target sensor 58 employs detuning devices 32, a three dimensional microstructure array 54, movement detectors 34, and a correlation device 36 to identify a target as well as a direction of movement of a target. In this embodiment, the three dimensional microstructure array 54 is exposed to target noise $T_N$. Then, the detuning devices 32 rapidly scan the microstructure arrays of the three dimensional microstructure array 54 such that the movement detectors 34 can sense deflection of respective individual microstructures of each microstructure array. The correlation device 36 then associates movement of individual microstructures 10 with corresponding acoustic frequencies and then associates these detected acoustic frequencies with stored acoustic frequencies of targets in a database.

For example, a database for the present invention may provide matching spectral analyses for automobiles, tanks, submarines, aircraft, missiles, torpedoes, and bullets. After identifying a match of acoustic energies, the correlation device 36 outputs to a display device 60 the name of the target and its corresponding acoustic spectral analysis. The correlation device 36 also outputs the results of its location calculations to a the display device 60 where a target's bearing relative to the three dimensional microstructure array 54 is displayed.

Target Identification and Bearing Based Upon Acoustic Signature

Figure 10:
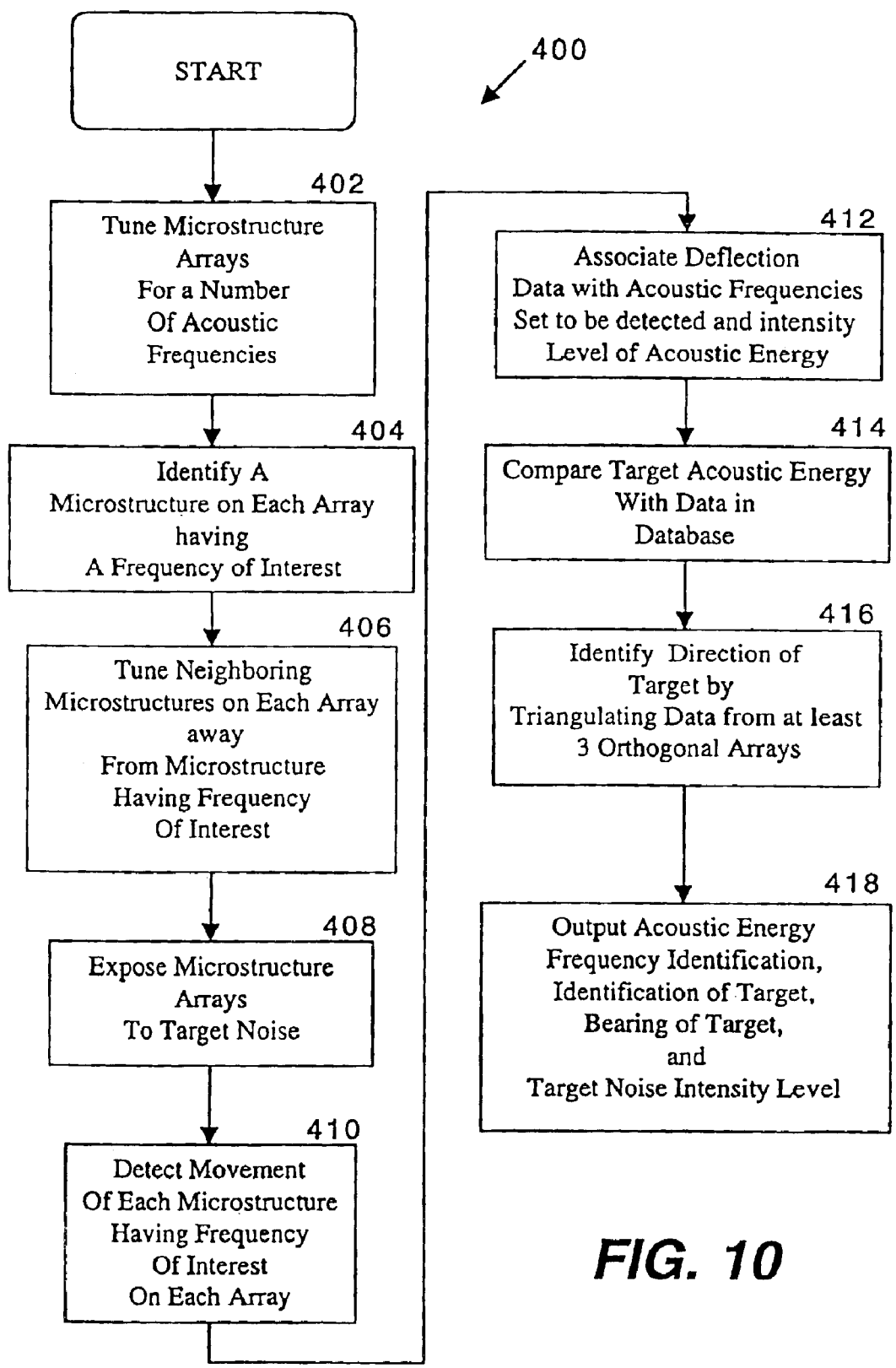
FIG. 10 is a logic flow diagram illustrating a process for identifying a target based upon detected acoustic frequencies of the target.

FIG. 10 illustrates a process where an target sensor 58 determines the bearing and identification of a target based upon an acoustic signature of the target. Step 402 is the first step in the target bearing and identification process 400. In step 402, a plurality of microstructure arrays 20 are tuned for a predetermined number of acoustic frequencies. In step 404, the target sensor 58 identifies a microstructure on each array having a frequency of interest. In step 406, the target sensor 58 tunes neighboring microstructures $10_N$ on each array away from a corresponding microstructure $10_i$ having an acoustic frequency of interest $f_i$. Following step 406, in step 408, the microstructure arrays 20 are exposed to a target noise. In step 410, the target sensor 58 detects deflection of each microstructure $10_i$ on each array 20 having the frequency of interest $f_i$. In step 412, the correlation device 36 of the target sensor 58 associates the deflection data received from the deflection detectors 34 with acoustic frequencies set to be detected and intensity levels of acoustic energy. In step 414, the correlation device 36 compares the detected target acoustic noise/energy with acoustic energy data in a database. In step 416, the correlation 20 are disposed in orthogonal manner in order to form a three dimensional microstructure array 54 as illustrated in FIG. 9. In step 418, the target sensor outputs the target's acoustic energy frequency identification, the identification of the target, the bearing of the target, and the target's noise intensity level.

With the present invention, the size of an acoustic sensor is substantially reduced while sensitivity of the sensor is substantially increased through the generation of tuning energy $T_E$. Further, the present invention provides an acoustic sensor with substantially fewer moving parts relative to the conventional art.

While the foregoing embodiment has been disclosed with respect to a target sensor that employs a three dimensional microstructure array 54 in order to identify a target, it would be understood that the microstructures disclosed in this embodiment and other embodiments can be employed for different acoustic sensing applications. For example, the three dimensional microstructure array 54 can be employed as part of an acoustic sensing device of a sonogram apparatus. Further, the microstructures of the present application and the rapid scanning thereof can be employed to produce an acoustic spectrometer that performs spectral analysis of acoustic energy. Other applications of the microstructures of the present application in combination with the detuning device 34 are not beyond the scope of the present invention.

Finally, it will be understood that the preferred embodiments have been disclosed by way of example, and that other modifications may occur to those skilled in the art without departing from the scope and spirit of the appended claims.

What is claimed is:

1. A sensor for detecting acoustic energy, comprising:
    a microstructure having a natural resonant acoustic frequency, said microstructure having first and second layers being formed from first and second materials respectively, said first material having a physical response in reaction to at least one form of energy other than acoustic energy that is different from a physical response of said second material in reaction to said at least one form of energy other than acoustic energy;
    wherein exposing said microstructure to said at least one form of energy other than acoustic energy causes said first and second layers to respond differently physically, creating physical stresses within said microstructure that change the resonant acoustic frequency of said microstructure from said natural resonant acoustic frequency to a predetermined resonant acoustic frequency;
    means for detecting movement of said microstructure;
    means for tuning said microstructure; and
    a display device operatively linked to said detecting means, whereby when acoustic energy strikes said sensor, acoustic energy having a frequency corresponding to said predetermined resonant frequency moves said microstructure, which said movement is detected by said detecting means.

2. The sensor of claim 1, wherein said means for tuning said microstructure dampens said microstructure such that a natural acoustic resonant frequency of said microstructure is altered.

3. The sensor of claim 1, wherein said detecting means includes a light source for directing a beam of light on said microstructure and a light detector for receiving light reflected off of said microstructure produced by said light source.

4. The sensor of claim 1, wherein said detecting means includes a capacitive sensing device.

5. The sensor of claim 1, wherein said microstructure includes piezoresistive material, said detecting means measures a change of resistance across said microstructure.

6. The sensor of claim 1, wherein said detecting means monitors a change of resonance of said microstructure.

7. A sensor for detecting acoustic energy, comprising:
    a microstructure array;
    said microstructure array comprising individual microstructures each having a natural resonant acoustic frequency, each said microstructure having first and second layers being formed from first and second materials respectively, said first material having a physical response in reaction to at least one form of energy other than acoustic energy that is different from a physical response of said second material in reaction to said at least one form of energy other than acoustic energy;
    means for dampening one or more of said microstructures such that a natural acoustic resonant frequency of said one or more microstructures is altered, whereby said microstructure array is tuned for said predetermined frequency range;
    means for detecting movement of individual microstructures in said microstructure array; and
    a display device operatively linked to said detecting means, whereby when acoustic energy strikes said sensor, acoustic energy falling within said predetermined frequency range moves individual microstructures, which said movement is detected by said detecting means.

8. A sensor for detecting acoustic energy, comprising:
    a microstructure array;
    said microstructure array comprising individual microstructures each having a natural resonant acoustic frequency, each said microstructure having first and second layers being formed from first and second materials respectively, said first material having a physical response in reaction to at least one form of energy other than acoustic energy that is different from a physical response of said second material in reaction to said at least one form of energy other than acoustic energy;
    wherein exposing said microstructures to said at least one form of energy other than acoustic energy causes said first and second layers to respond differently physically, creating physical stresses within said microstructures that change the resonant acoustic frequency of at least one of said microstructures from its natural resonant acoustic frequency to a resonant acoustic frequency lying within a predetermined frequency range;
    whereby said microstructure array is tuned for said predetermined frequency range;
    means for detecting movement of individual microstructures in said microstructure array; and
    a display device operatively linked to said detecting means, whereby when acoustic energy strikes said sensor, acoustic energy falling within said predetermined frequency range moves individual microstructures, which said movement is detected by said detecting means.

9. The sensor of claim 8, wherein said detecting means includes a light source for directing a beam of light on said microstructure and a light detector for receiving light reflected off of said microstructure produced by said light source.

10. The sensor of claim 8, wherein said detecting means includes a capacitive sensing device.

11. The sensor of claim 8, wherein each microstructure of said microstructure array includes piezoresistive material, and wherein said detecting means measures a change of voltage across said microstructure.

12. The sensor of claim 8, wherein said detecting means monitors a change of resonance of each microstructure in said microstructure array.

13. A method for detecting acoustic energy comprising the steps of:

providing a microstructure array, said microstructure array comprising individual microstructures each having a natural resonant acoustic frequency, each said microstructure having first and second layers being formed from first and second materials respectively, said first material having a physical response in reaction to at least one form of energy other than acoustic energy that is different from a physical response of said second material in reaction to said at least one form of energy other than acoustic energy;

dampening at least one of said microstructures such that a natural acoustic resonant frequency of said at least one microstructure is altered;

whereby said microstructure array is tuned for said predetermined acoustic frequency range;

exposing said microstructure array to acoustic energy;

detecting movement of individual microstructures in said microstructure array; and displaying detected acoustic frequencies on a display device.

14. A method for detecting acoustic energy comprising the steps of:

providing a microstructure array, said microstructure array comprising individual microstructures each having a natural resonant acoustic frequency, each said microstructure having first and second layers being formed from first and second materials respectively, said first material having a physical response in reaction to at least one form of energy other than acoustic energy that is different from a physical response of said second material in reaction to said at least one form of energy other than acoustic energy;

detuning neighboring microstructures away from a natural acoustic resonant frequency of a selected microstructure in said microstructure array;

exposing said microstructure array to acoustic energy;

detecting movement of individual microstructure in said microstructure array; and displaying detected acoustic frequencies on a display device.

15. The method of claim 14, wherein the step of detuning comprises the step of exposing said neighboring microstructures with energy other than acoustic energy.

16. The method of claim 15, wherein said energy other than acoustic energy is at least one of light energy, thermal energy, and energy derived from an electric field.

17. The sensor of claim 14, wherein said detuning step comprises the step of dampening said neighboring microstructures such that a natural acoustic resonant frequency of said neighboring microstructures is altered.

18. The method of claim 14, wherein said detecting step further comprises the steps of:

activating a laser device;

focusing light energy from said laser device onto an individual microstructure; and detecting movement of said light energy with a light detector in accordance with movement of said individual microstructure.

19. The method of claim 14, wherein said detecting step further comprises the steps of detecting movement of each microstructure with a capacitance sensing device.

20. The method of claim 14, wherein each microstructure comprises piezoresistive material, and wherein said detecting step comprises the step of measuring a change of resistance across each microstructure.

21. The method of claim 14, wherein said detecting step comprises the step of detecting movement of each microstructure according to a change of resonance of a respective microstructure.

* * * * *